United States Patent
Bennet et al.

(10) Patent No.: US 10,877,740 B2
(45) Date of Patent: Dec. 29, 2020

(54) DYNAMICALLY DEPLOYING A COMPONENT IN AN APPLICATION

(71) Applicant: ASG Technologies Group, Inc., Naples, FL (US)

(72) Inventors: Gabriel Bennet, Nice (FR); Braulio Megías, Barcelona (ES)

(73) Assignee: ASG Technologies Group, Inc., Naples, FL (US)

( * ) Notice: Subject to any disclaimer, the term of this patent is extended or adjusted under 35 U.S.C. 154(b) by 0 days.

(21) Appl. No.: 15/858,559

(22) Filed: Dec. 29, 2017

(65) Prior Publication Data

US 2019/0205111 A1 Jul. 4, 2019

(51) Int. Cl.
| | |
|---|---|
| *G06F 9/445* | (2018.01) |
| *G06F 8/65* | (2018.01) |
| *H04L 29/08* | (2006.01) |
| *H04L 29/06* | (2006.01) |
| *G06F 8/60* | (2018.01) |
| *G06F 9/451* | (2018.01) |

(52) U.S. Cl.
CPC ............ *G06F 8/65* (2013.01); *G06F 9/44521* (2013.01); *H04L 67/025* (2013.01); *H04L 67/34* (2013.01); *G06F 8/60* (2013.01); *G06F 9/451* (2018.02); *H04L 67/42* (2013.01)

(58) Field of Classification Search
CPC ..... G06F 8/61; G06F 8/60; G06F 8/65; G06F 9/445; G06F 9/4452; G06F 9/451; H04L 29/08981; H04L 67/025; H04L 67/34; H04L 67/42
USPC .................................................. 717/168, 178
See application file for complete search history.

(56) References Cited

U.S. PATENT DOCUMENTS

| | | | |
|---|---|---|---|
| 5,528,263 | A | 6/1996 | Platzker et al. |
| 5,742,285 | A | 4/1998 | Ueda |
| 6,069,957 | A | 5/2000 | Richards |
| 6,208,345 | B1 | 3/2001 | Sheard et al. |
| 6,331,855 | B1 | 12/2001 | Schauser |

(Continued)

FOREIGN PATENT DOCUMENTS

| | | |
|---|---|---|
| EP | 3430529 A1 | 1/2019 |
| EP | 3714604 A1 | 9/2020 |

(Continued)

OTHER PUBLICATIONS

"International Search Report" and "Written Opinion of the International Searching Authority," Patent Cooperation Treaty Application No. PCT/US2018/056196, dated Dec. 26, 2018, 8 pages.

(Continued)

*Primary Examiner* — Chuck O Kendall
(74) *Attorney, Agent, or Firm* — Carr & Ferrell LLP (57) ABSTRACT

Provided are computer-implemented methods and systems for dynamically deploying a component in an application. An example method for dynamically deploying a component in an application may include building, by a front-end application platform, a client-side application. The method may further include deploying the client-side application to a browser associated with a client device. The method may continue with receiving, from a customer associated with the client device, a request to deploy a component in the client-side application. The method may further include dynamically loading the component in the client-side application.

21 Claims, 5 Drawing Sheets

(56) References Cited

U.S. PATENT DOCUMENTS

| | | |
|---|---|---|
| 6,574,321 B1 | 6/2003 | Cox et al. |
| 9,213,707 B2 | 12/2015 | Conner |
| 9,483,537 B1 | 11/2016 | Peters et al. |
| 9,621,428 B1 | 4/2017 | Lev et al. |
| 10,162,624 B1* | 12/2018 | Moturu ............... G06F 9/45529 |
| 10,812,611 B2 | 10/2020 | Bennet et al. |
| 2004/0078373 A1 | 4/2004 | Ghoneimy et al. |
| 2004/0153994 A1 | 8/2004 | Bates et al. |
| 2004/0177323 A1 | 9/2004 | Kaasila et al. |
| 2006/0031854 A1 | 2/2006 | Godwin |
| 2006/0039466 A1 | 2/2006 | Emerson et al. |
| 2006/0111888 A1 | 5/2006 | Hiew et al. |
| 2006/0271528 A1 | 11/2006 | Gorelik |
| 2007/0016624 A1 | 1/2007 | Powers et al. |
| 2007/0028286 A1 | 2/2007 | Greene et al. |
| 2007/0156764 A1 | 7/2007 | O'Connell et al. |
| 2007/0266394 A1 | 11/2007 | Odent et al. |
| 2008/0209390 A1 | 8/2008 | Dutta et al. |
| 2009/0083306 A1 | 3/2009 | Sichi et al. |
| 2010/0114628 A1 | 5/2010 | Adler et al. |
| 2010/0131857 A1 | 5/2010 | Prigge |
| 2010/0225658 A1 | 9/2010 | Coleman |
| 2010/0226441 A1 | 9/2010 | Tung et al. |
| 2010/0231599 A1 | 9/2010 | Tung et al. |
| 2011/0246904 A1 | 10/2011 | Pinto et al. |
| 2012/0075333 A1 | 3/2012 | Chen et al. |
| 2012/0310875 A1 | 12/2012 | Prahlad et al. |
| 2013/0117662 A1 | 5/2013 | Shan et al. |
| 2013/0151557 A1 | 6/2013 | Shanken et al. |
| 2013/0332423 A1 | 12/2013 | Puri et al. |
| 2014/0032875 A1 | 1/2014 | Butler |
| 2014/0047011 A1 | 2/2014 | Lahav et al. |
| 2014/0047413 A1 | 2/2014 | Sheive et al. |
| 2014/0089388 A1 | 3/2014 | Curry et al. |
| 2014/0114907 A1 | 4/2014 | Kozina et al. |
| 2015/0012478 A1 | 1/2015 | Mohammad et al. |
| 2015/0293764 A1* | 10/2015 | Visvanathan ............ G06F 8/36 717/102 |
| 2016/0070541 A1 | 3/2016 | Lee et al. |
| 2016/0117159 A1* | 4/2016 | Balko ................ G11B 27/031 717/178 |
| 2016/0140204 A1 | 5/2016 | Brown et al. |
| 2016/0253340 A1 | 9/2016 | Barth et al. |
| 2016/0267082 A1 | 9/2016 | Wong et al. |
| 2016/0275439 A1* | 9/2016 | Avats ............. G06Q 10/063118 |
| 2017/0068395 A1 | 3/2017 | Massoudi |
| 2017/0123751 A1 | 5/2017 | Sigurdsson et al. |
| 2017/0270022 A1 | 9/2017 | Moresmau et al. |
| 2017/0339564 A1 | 11/2017 | Momchilov et al. |
| 2018/0167426 A1 | 6/2018 | Sigurdsson et al. |
| 2018/0174104 A1 | 6/2018 | Schikora et al. |
| 2019/0158630 A1 | 5/2019 | Aragón et al. |
| 2019/0205111 A1* | 7/2019 | Bennet .................... H04L 67/34 |
| 2019/0208031 A1 | 7/2019 | Bennet et al. |
| 2019/0243742 A1 | 8/2019 | Natari |

FOREIGN PATENT DOCUMENTS

| | | |
|---|---|---|
| EP | 3732566 | 11/2020 |
| EP | 3732582 | 11/2020 |
| WO | WO2017160831 A1 | 9/2014 |
| WO | WO2019099140 A1 | 5/2019 |
| WO | WO2019133208 A1 | 7/2019 |
| WO | WO2019133209 A1 | 7/2019 |

OTHER PUBLICATIONS

"International Search Report" and "Written Opinion of the International Searching Authority," Patent Cooperation Treaty Application No. PCT/US2018/064127, dated Feb. 11, 2019, 6 pages.

"International Search Report" and "Written Opinion of the International Searching Authority," Patent Cooperation Treaty Application No. PCT/US2018/064122, dated Mar. 18, 2019, 8 pages.

"International Search Report" and "Written Opinion of the International Searching Authority," Patent Cooperation Treaty Application No. PCT/US2017/022295, dated Jun. 1, 2017, 9 pages.

"Extended European Search Report" and "Written Opinion", European Application No. 17767331.6, dated Nov. 14, 2019, 6 pages.

"International Search Report" and "Written Opinion of the International Searching Authority," Patent Cooperation Treaty Application No. PCT/US2020/037028, dated Aug. 28, 2020, 13 pages.

\* cited by examiner

DYNAMICALLY DEPLOYING A COMPONENT IN AN APPLICATION

FIELD

This application relates generally to data processing and, more specifically, to systems and methods for dynamically deploying components in applications.

BACKGROUND

Web applications have gained widespread popularity. A plurality of web application frameworks is currently used for development of web applications. In development of the web applications, a web components technology may be used for creating web components or widgets in web applications. Web components are typically supported by browsers and do not require additional libraries.

When a web component is deployed to a web application, certain modifications need to be made to the web application. Typically, a web application framework associated with the web application is not capable of runtime integration of the web component into the current version of the web application. Instead, each time a new web component is deployed to the web application, the web application is rebuilt, i.e., a new version of the application containing the new web component is created. Thus, a user is unable to add web components dynamically to the currently running version of the web application.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are computer-implemented methods and systems for dynamically deploying a component in an application. In some example embodiments, a method for dynamically deploying a component in an application may include building, by a front-end application platform, a client-side application. The method may further include deploying the client-side application to a browser associated with a client device. The method may continue with receiving, from a customer associated with the client device, a request to deploy a component in the client-side application. The method may further include dynamically loading the component in the client-side application.

In some example embodiments, a system for dynamically deploying a component in an application may include an application server and a front-end application platform. The front-end application platform may be configured to build a client-side application. The application server may be configured to deploy the client-side application to a browser associated with a client device. The application server may be further configured to receive, from a customer associated with the client device, a request to deploy a component in the client-side application. The application server may be further configured to dynamically load the component in the client-side application.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Provided are computer-implemented methods and systems for dynamically deploying a component in an application. According to the disclosed methods and systems, an end-user device, also referred herein to as a client device or a user device, may include a web browser configured to communicate with an application server via a network. The end-user device may be associated with an end user, also referred herein as a user or a customer. The end user may be registered with a web portal associated with the application server and may be currently logged into the web portal. The web portal may include a collaborative platform for a plurality of users and a plurality of applications.

The plurality of applications associated with the application server may be developed using a front-end application platform configured to build client-side applications, also referred herein to as applications. In an example embodiment, the front-end application platform is Angular. Angular, commonly referred to as "Angular 2+" or "Angular 2", is a TypeScript-based front-end web application platform addressing all of the parts of the developer's workflow and utilized for building complex web applications. Specifically, Angular can be used to build client applications in Hypertext Markup Language (HTML) and in programming languages like JavaScript or TypeScript that complies with JavaScript. Angular combines declarative templates, dependency injection, end to end tooling, and integrated practices to solve problems related to the development of applications. Angular enables developers to build web, mobile, and desktop applications.

Angular is used to create single-page web applications. When the end user connects to the application server for the first time, the entire web application is deployed to the web browser associated with the client device. Thus, the application developed using the front-end application platform is deployed to the browser of the client device. The end user downloads HTML or JavaScript code, page content, and all information related to the application to the web browser. Upon receiving all necessary data related to the application, the end user may use the application, for example, navigate a portal if the application is part of the portal. The user may continue using the application as if the application is run locally on the web browser because all necessary data related to the application are downloaded to the client side, i.e., to the end-user device. The web browser may request additional data from the application server as needed, and send data related to the end user behavior related to the application (actions, navigation, activity, commands, and so forth) to the application server.

Typically, applications developers need to write code in order to embed web components into an application. The web components may be tailored to specific needs of the customer that uses the application. The web components may be in a form of widgets. Thus, the client-side application may include a plurality of web components.

The customer may want to add a web component developed by the customer or by a third party to the web application. Accordingly, the customer can perform an action that sends a request to the application server to dynamically deploy a component to the client-side application. In an example embodiment, the request may include the component developed by the customer. The request may indicate a URL associated with the component, so that the application server can download the component from the URL. Upon request, the component can be registered with the front-end application platform.

The application server may receive the request and, in response to the request, dynamically load the component into the client-side application. The component loaded into the application may be displayed as a widget associated with the application. Thus, the component can be dynamically consumed by the web application on the customer side. The customer may extend the web application dynamically to the customer side. The developers of the application do not need to perform any building steps to make the component part of the application or rebuild the web application to provide a new version of the web application with the embedded component.

If the client-side application is a workspace product, e.g., a workspace portal, the customer may add content to the workspace portal in a form of the component inside the workspace portal. In other words, the customer may publish web components to the workspace portal. The components may be dynamically loaded in the workspace portal. Upon loading, the workspace portal displayed on the client side may include a widget related to the components provided by the customer.

Figure 1:
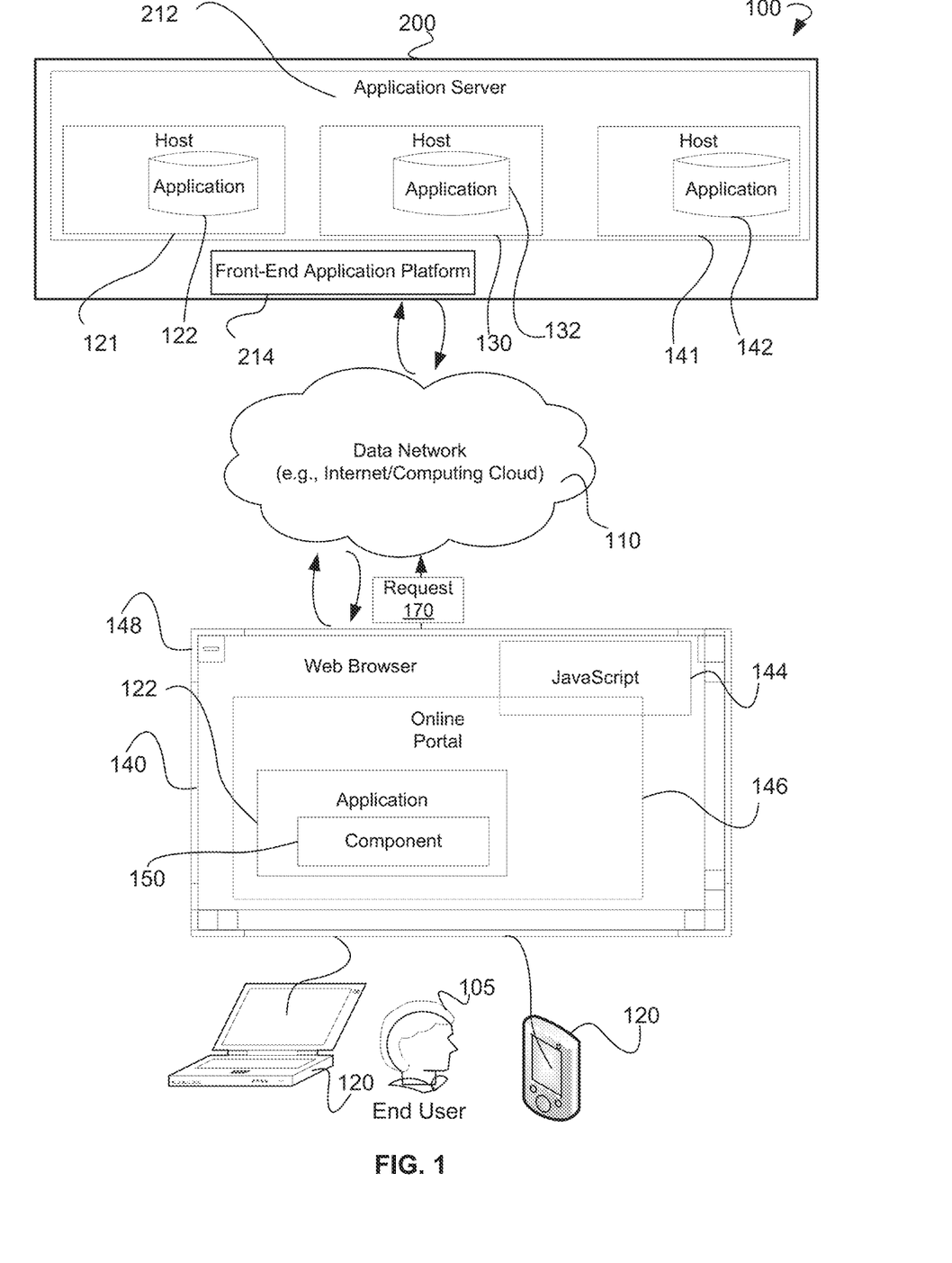
FIG. 1 illustrates an environment within which methods and systems for dynamically deploying a component in an application can be implemented, according to an example embodiment.

Referring now to the drawings, FIG. 1 illustrates an environment 100 within which methods and systems for dynamically deploying a component in an application can be implemented. The environment 100 may include a data network 110 (e.g., an Internet or a computing cloud), an end user 105, a client device 120 shown as a laptop or a smartphone associated with the end user 105, and a system 200 for dynamically deploying a component in an application. The system 200 may include an application server 212 and a front-end application platform 214. The application server 212 may have a plurality of hosts 121, 130, 141 for a plurality of web applications 122, 132, 142. The client device 120 may have a user interface 148. Furthermore, a web browser 140 may be running on the client device 120 and may be displayed using the user interface 148. The web browser 140 may communicate with the application server 212 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 may use JavaScript 144 to display a web page associated with an online portal 146. The online portal 146 may include a workspace portal that contains a plurality of web applications 122, 132, 142 running on the application server 212. The web browser 140 may establish a communication channel with the application server 212 and may generate and render virtual screens based on data received from the application server 212. Specifically, the web browser 140 may display the generated virtual screens of one of the applications, such as the application 122, to the end user 105.

The end user 105 may send a request 170 to the application server 212 using the client device 120. The request 170 may include a request to deploy a component 150 to the application 132. In response to the request 170, the application server 212 may load the component 150 to the application 122. The application 122 and the component 150 may be rendered by the web browser 140.

Figure 2:
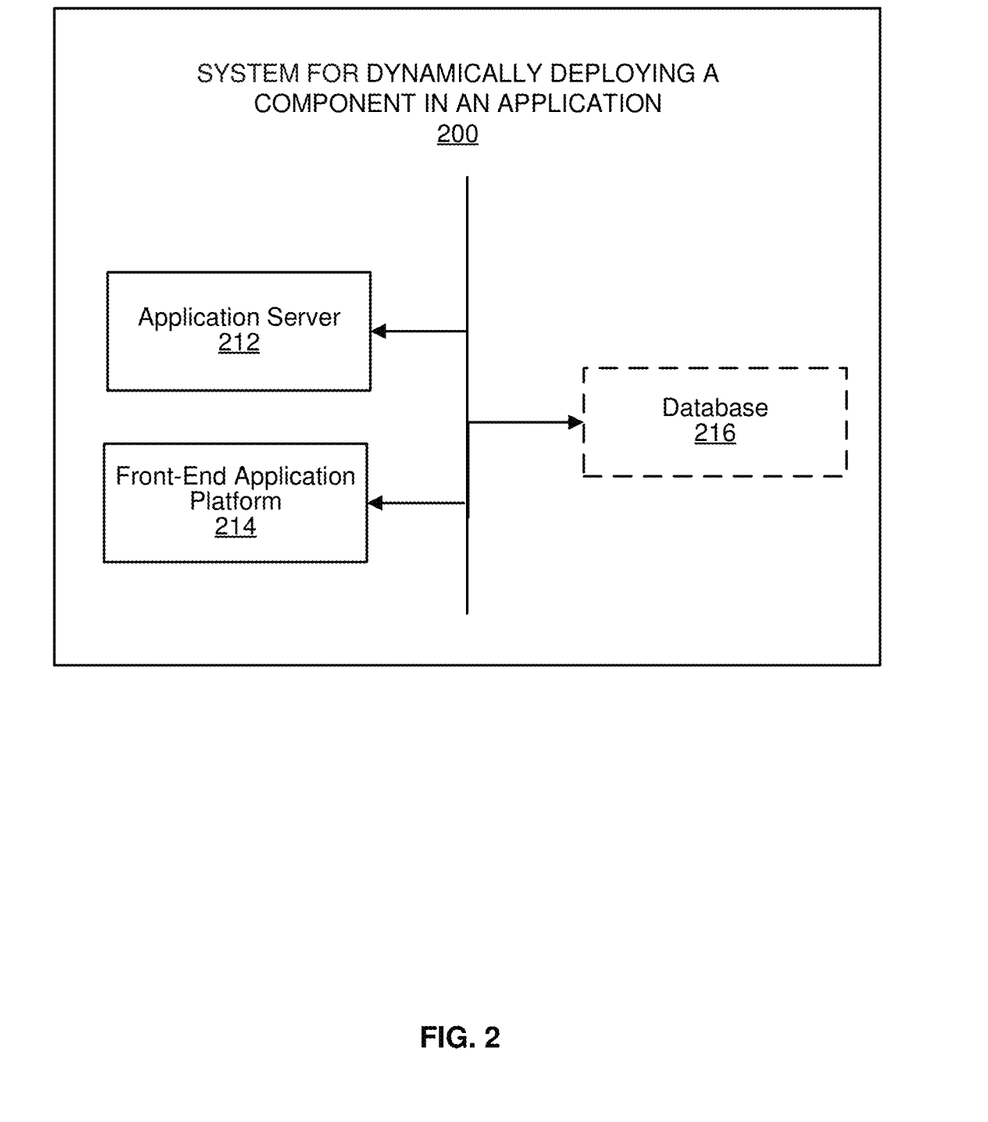
FIG. 2 is a block diagram of a system for dynamically deploying a component in an application, according to an example embodiment.

FIG. 2 shows a block diagram illustrating various modules of a system 200 for dynamically deploying a component in an application, according to an example embodiment. The system 200 may include an application server 212, a front-end application platform 214, and optionally a database 216. The front-end application platform 214 may be configured to build a client-side application. In an example embodiment, the front-end application platform is Angular. The client-side application may be built using one or more of the following: HTML, JavaScript, and TypeScript. In an example embodiment, the client-side application may be built as a single page application. The single-page application may include a portal of a workspace customized for the customer. The application server 212 may be configured to deploy the client-side application to a browser associated with a client device. The deployment of the application to the browser may include downloading the single-page application to the browser upon establishing a communication channel between the client device and the application server.

The application server 212 may be further configured to receive a request to deploy a component to the client-side application. The request may be received from a customer associated with the client device. In an example embodiment, the component may include a web component developed by one or more of the following: the customer and a third party. The component may be configurable to be displayed as a widget in a dashboard of a workspace product. The workspace product may include the portal of the workspace customized for the customer.

The application server 212 may be further configured to dynamically load the component in the client-side application. The dynamic loading of the component may entail registering the component with the front-end application platform and uploading the component to the client-side application. In an example embodiment, the component may be configurable as a widget in a dashboard of a portal. Upon loading of the component in the client-side application, the browser may display the client-side application together with the component embedded into the client-side application for the customer.

The database 216 may store data associated with the application server 212, the front-end application platform 214, and a plurality of applications running on the application server 212.

Figure 3:
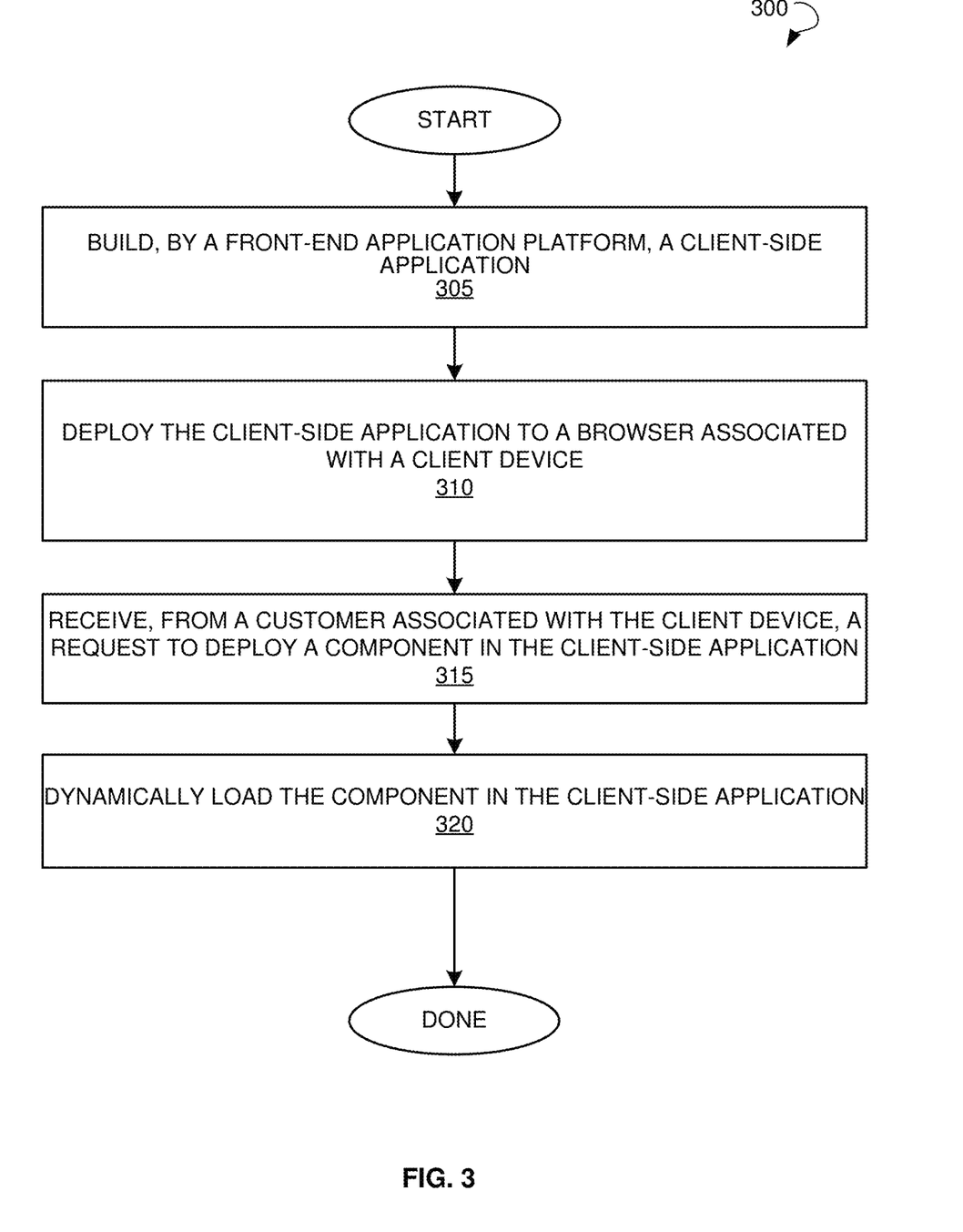
FIG. 3 illustrates a flow chart of a method for dynamically deploying a component in an application, according to an example embodiment.

FIG. 3 shows a process flow diagram of a method 300 for dynamically deploying a component in an application, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with building, by a front-end application platform, a client-side application at operation 305. In an example embodiment, the front-end application platform is Angular. The client-side application may be built using one or more of the following: HTML, JavaScript, and TypeScript. The client-side application may be built as a single page application. In an example embodiment, the single-page application may include a workspace portal customized for the customer. The method 300 may continue with deploying the client-side application to a browser associated with a client device at operation 310. The deployment of the client-side application to the browser may include downloading HTML or JavaScript code, page content, and all information related to the client-side application to the web browser. In an example embodiment, the deployment of the application to the browser may include downloading the single-page application to the browser upon establishing a communication channel between the client device and an application server.

The method 300 may further include receiving, from a customer associated with the client device, a request to deploy a component in the client-side application at operation 315. The component may include a web component developed by one or more of the following: the customer and a third party. The component may be configurable to be displayed as a widget in a dashboard of a workspace product.

The method 300 may further include dynamically loading the component in the client-side application at operation 320. The dynamical loading of the component may include registering the component with the front-end application platform and uploading the component to the client-side application. The component may be configurable as a widget in a dashboard of a portal. The component may be displayed in the client-side application by the web browser.

Figure 4:
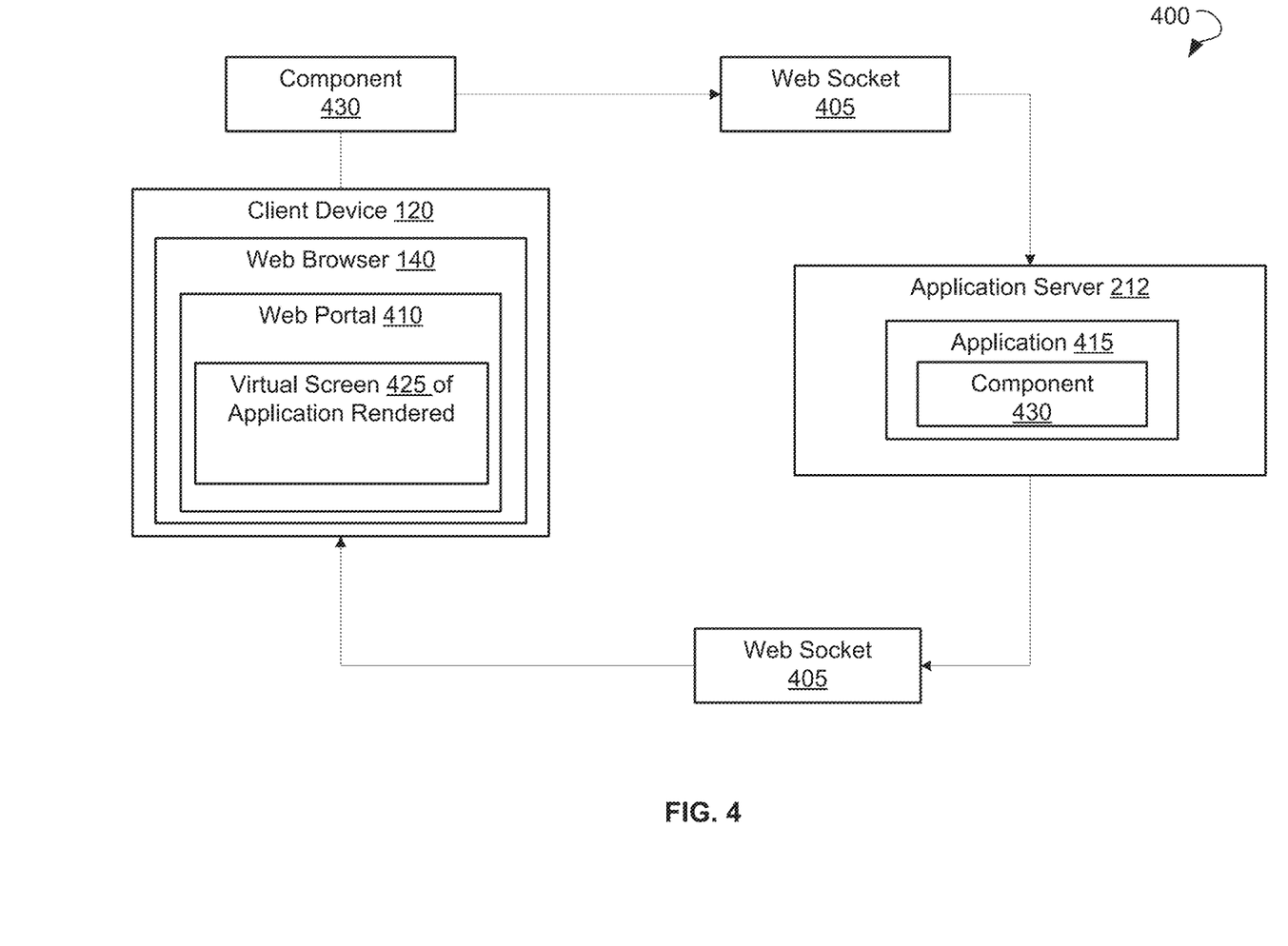
FIG. 4 is a block diagram illustrating an interaction between a client device and an application server in the course of dynamical deploying of a component in an application, according to an example embodiment.

FIG. 4 is a block diagram 400 illustrating an interaction between a client device and an application server in the course of dynamically deploying a component in an application, according to an example embodiment. A client device 120 may include a web browser 140 running on the client device 120. The client device 120 may include a communication session with an application server 212. The client device 120 and the application server 212 may communicate via a web socket 405. The web socket 405 is a bidirectional communication technology for web applications that operates over a single socket and is executed via a JavaScript interface in HTML5 compliant web browsers. The web socket 405 may include an HTTP connection between a web browser 140 and the application server 212. The web socket 405 enables the web browser 140 to maintain the connection with the application server 212 open and to allow exchanging communications between the web browser 140 and the application server 212 at any time.

The web browser 140 may be connected to a web portal 410. The web portal 410 may be associated with the application server 212 and displayed in the web browser 140. The application 415 may be executed by the application server 212. The application 415 may be deployed to the web browser 140 and displayed on a virtual screen 425 of the web browser 140.

An end user of the client device 120 may want to embed a component 430, i.e., a web component, into the application 415. To that end, the end user may send a request containing the component 430 to the application server 212.

The application server 212 may receive the request and the component 430 from the client device 120 and dynamically load the component 430 in the application 415. Accordingly, the virtual screen 425 may display the application 415 with the component 430 embedded into the application 415.

The customer may dynamically extend the application 415 by adding a plurality of components to the application 415. Thus, the application 415 may be customized based on the needs of the customer by deploying, to the application 415, one or more components.

Figure 5:
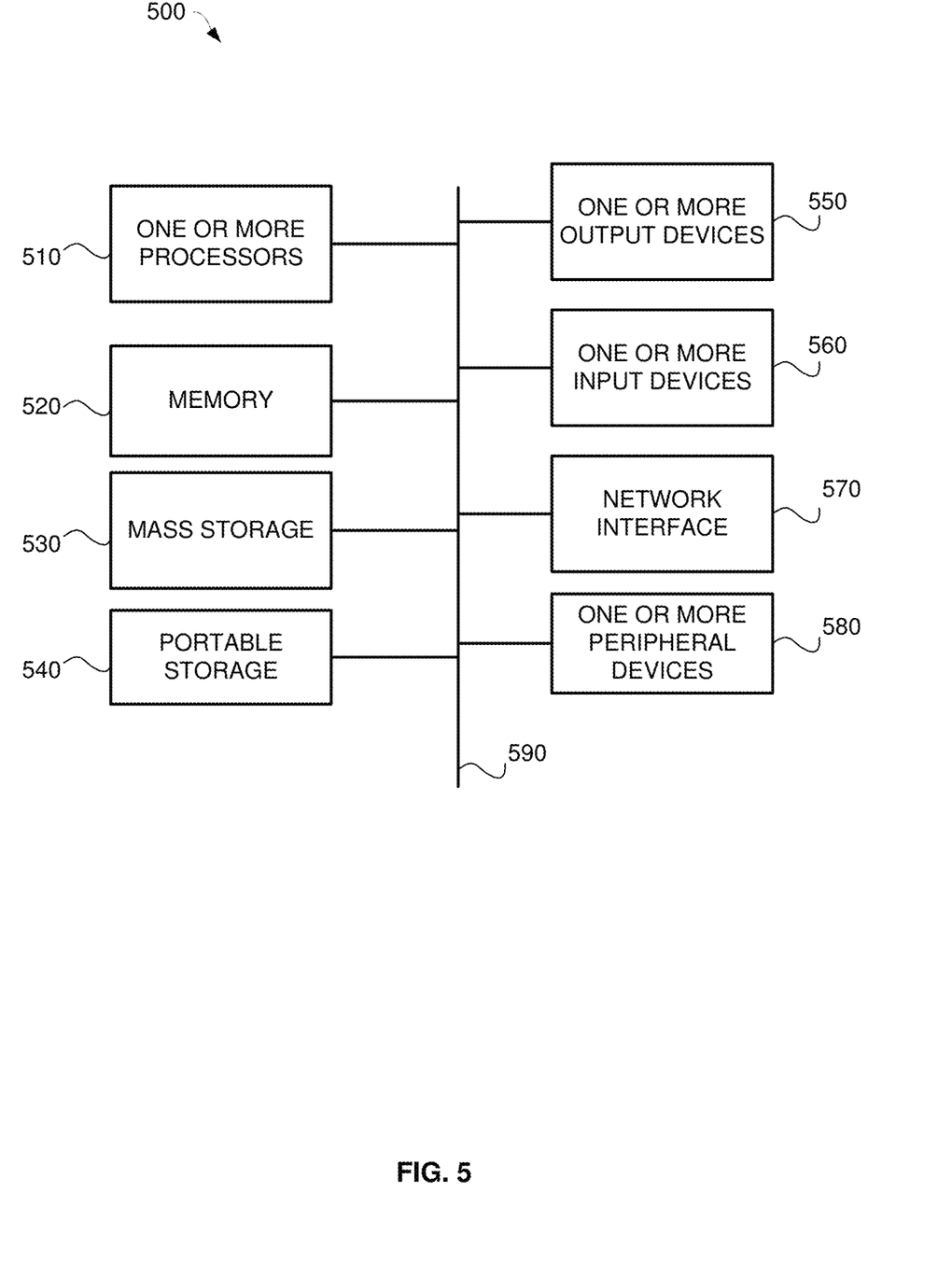
FIG. 5 is a computing system that can be used to implement a method for optimization of publication of a web application to a web browser, according to an example embodiment.

FIG. 5 illustrates an exemplary computing system 500 that may be used to implement embodiments described herein. The exemplary computing system 500 of FIG. 5 may include one or more processors 510 and memory 520. Memory 520 may store, in part, instructions and data for execution by the one or more processors 510. Memory 520 can store the executable code when the exemplary computing system 500 is in operation. The exemplary computing system 500 of FIG. 5 may further include a mass storage 530, portable storage 540, one or more output devices 550, one or more input devices 560, a network interface 570, and one or more peripheral devices 580.

The components shown in FIG. 5 are depicted as being connected via a single bus 590. The components may be connected through one or more data transport means. The one or more processors 510 and memory 520 may be connected via a local microprocessor bus, and the mass storage 530, one or more peripheral devices 580, portable storage 540, and network interface 570 may be connected via one or more input/output buses.

Mass storage 530, which may be implemented with a magnetic disk drive or an optical disk drive, is a non-volatile storage device for storing data and instructions for use by a magnetic disk or an optical disk drive, which in turn may be used by one or more processors 510. Mass storage 530 can store the system software for implementing embodiments described herein for purposes of loading that software into memory 520.

Portable storage 540 may operate in conjunction with a portable non-volatile storage medium, such as a compact disk (CD) or digital video disc (DVD), to input and output data and code to and from the computing system 500 of FIG. 5. The system software for implementing embodiments described herein may be stored on such a portable medium and input to the computing system 500 via the portable storage 540.

One or more input devices 560 provide a portion of a user interface. The one or more input devices 560 may include an alphanumeric keypad, such as a keyboard, for inputting alphanumeric and other information, or a pointing device, such as a mouse, a trackball, a stylus, or cursor direction keys. Additionally, the computing system 500 as shown in FIG. 5 includes one or more output devices 550. Suitable one or more output devices 550 include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 580 may include any type of computer support device to add additional functionality to the computing system. The one or more peripheral devices 580 may include a modem or a router.

The components contained in the exemplary computing system 500 of FIG. 5 are those typically found in computing systems that may be suitable for use with embodiments described herein and are intended to represent a broad category of such computer components that are well known in the art. Thus, the exemplary computing system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for dynamically deploying a component in an application have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A system for dynamically deploying a web component in an application, the system comprising:
an application server configured to:
receive a client-side application built using a front-end Angular application platform;
deploy the client-side application to a web browser associated with a client device;
receive, from a customer associated with the client device, a request to deploy a web component in the client-side application, wherein the request includes the web component and the request includes a uniform resource locator (URL) for downloading the web component from the application server, wherein the web component is developed by the customer and the web component is registered with the front-end Angular application platform; and
dynamically load the web component in the client-side application for display in the client-side application by the web browser associated with the client device, the client-side application being a portal of a workspace customized for the customer and the web component being displayed in a workspace product of the workspace.

2. The system of claim 1, wherein the client-side application is built using one or more of the following: HTML, JavaScript, and TypeScript.

3. The system of claim 1, wherein the client-side application is built as a single-page application.

4. The system of claim 3, wherein the single-page application is a portal of the workspace customized for the customer.

5. The system of claim 3, wherein the deploying the application to the web browser includes downloading the single-page application to the web browser upon establishing a communication channel between the client device and the application server.

6. The system of claim 1, wherein the web component is configurable to be displayed as a widget in a dashboard of the workspace product.

7. The system of claim 1, wherein the dynamically loading includes:
registering the web component with the front-end application platform; and
uploading the web component to the client-side application.

8. The system of claim 7, wherein the web component is configurable as a widget in a dashboard of the portal.

9. A method for dynamically deploying a web component in an application by an application server, the method comprising:
receiving a client-side application that is built by a front-end application platform;
deploying the received client-side application to a web browser associated with a client device;
receiving, from a customer associated with the client device, a request to deploy a web component in the client-side application, wherein the request includes the web component and the request includes a uniform resource locator (URL) for downloading the web component from the application server, wherein the web component is developed by the customer and the web component is registered with the front-end Angular application platform; and
dynamically loading the web component in the client-side application for display in the client-side application by the web browser associated with the client device, the client-side application being a portal of a workspace customized for the customer and the web component being displayed in a workspace product of the workspace.

10. The method of claim 9, wherein the client-side application is built using one or more of the following: HTML, JavaScript, and TypeScript.

11. The method of claim 9, wherein the client-side application is built as a single-page application.

12. The method of claim 11, wherein the single-page application is a portal of he workspace customized for the customer.

13. The method of claim 11, wherein the deploying the application to the web browser includes downloading the single-page application to the web browser upon establishing a communication channel between the client device and the application server.

14. The method of claim 9, wherein the web component is configurable to be displayed as a widget in a dashboard of the workspace product.

15. The method of claim 9, wherein the dynamically loading includes:
registering the web component with the front-end application platform; and uploading the web component to the client-side application, wherein the web component is configurable as a widget in a dashboard of the portal.

16. A system for dynamically Deploying a web component in an application, the system comprising:
a front-end Angular application platform that is configured to:
build a client-side application; and
an application server configured to:
deploy the client-side application to a web browser associated with a client device, wherein the deploying the client-side application to the web browser includes:
downloading the client-side application to the web browser upon establishing a communication channel between the client device and the application server;
receive, from a customer associated with the client device, a request to deploy a web component in the client-side application, wherein the request includes the web component and the request includes a uniform resource locator for downloading the web component from the application server, the web component being developed by the customer and the web component being registered with the front-end Angular application platform; and
dynamically load the web component in the client-side application, wherein the dynamically loading includes:
registering the web component with the front-end application platform; and
uploading the web component to the client-side application, the client-side application being a portal of a workspace customized for the customer and the web component being displayed in a workspace product of the workspace.

17. The system of claim 1, wherein the request indicates the URL associated with the web component that directs the application server to download the web component from the URL.

18. The method of claim 9, wherein the request indicates the URL associated with the web component that directs the application server to download the web component from the URL.

19. The method of claim 9, wherein the client device and the application server communicate directly via a web socket.

20. The method of claim 9, wherein the front-end application platform is Angular.

21. The method of claim 9, wherein the application server is further configured to dynamically load the web component into a same version of the client-side application.

* * * * *

UNITED STATES PATENT AND TRADEMARK OFFICE
CERTIFICATE OF CORRECTION

PATENT NO. : 10,877,740 B2
APPLICATION NO. : 15/858559
DATED : December 29, 2020
INVENTOR(S) : Gabriel Bennet et al.

It is certified that error appears in the above-identified patent and that said Letters Patent is hereby corrected as shown below:

In the Claims

Column 10 Line 19, that portion reading:
-application is a portal of he workspace-
Should read:
--application is a portal of the workspace--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*